(12) United States Patent
Shichino

(10) Patent No.: US 11,750,245 B2
(45) Date of Patent: Sep. 5, 2023

(54) POWER TRANSMISSION APPARATUS, POWER RECEPTION APPARATUS, METHOD, AND RECORDING MEDIUM

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 367 days.

(21) Appl. No.: 17/174,108

(22) Filed: Feb. 11, 2021

(65) Prior Publication Data
US 2021/0167817 A1 Jun. 3, 2021

Related U.S. Application Data

(63) Continuation of application No. 16/534,535, filed on Aug. 7, 2019, now Pat. No. 10,951,270, which is a continuation of application No. PCT/JP2018/002405, filed on Jan. 26, 2018.

(30) Foreign Application Priority Data

Feb. 8, 2017 (JP) ................................ 2017-021604

(51) Int. Cl.
| | |
|---|---|
| *H02J 50/10* | (2016.01) |
| *H02J 50/12* | (2016.01) |
| *H02J 7/02* | (2016.01) |
| *H02J 50/80* | (2016.01) |
| *H04B 5/00* | (2006.01) |
| *H04W 52/00* | (2009.01) |

(52) U.S. Cl.
CPC ............ *H04B 5/0037* (2013.01); *H02J 50/10* (2016.02); *H04B 5/0031* (2013.01); *H04B 5/0093* (2013.01); *H04W 52/00* (2013.01); *H02J 50/12* (2016.02); *H02J 50/80* (2016.02)

(58) Field of Classification Search
None
See application file for complete search history.

(56) References Cited

U.S. PATENT DOCUMENTS

| | | | | |
|---|---|---|---|---|
| 8,248,026 B2* | 8/2012 | Sip | ........................... | H02J 50/80 320/108 |
| 8,653,698 B2* | 2/2014 | Baarman | ............. | H01F 27/2871 307/104 |
| 9,054,547 B2* | 6/2015 | Byun | ....................... | H02J 50/12 |
| 9,252,846 B2* | 2/2016 | Lee | ....................... | H04B 5/0031 |

(Continued)

FOREIGN PATENT DOCUMENTS

JP 2010245825 A 10/2010

*Primary Examiner* — Tuan A Tran
(74) *Attorney, Agent, or Firm* — Canon U.S.A., Inc. IP Division (57) ABSTRACT

A power transmission apparatus has a first communication function for communicating with a power reception apparatus and a second communication function for communicating with the power reception apparatus at a radio frequency different from a radio frequency used in the first communication function, and makes a decision as to whether to use the first communication function or the second communication function in communication for controlling wireless transmission of power, the decision being made on the basis of device information obtained from the power reception apparatus through communication using the first communication function.

20 Claims, 7 Drawing Sheets

(56) References Cited

U.S. PATENT DOCUMENTS

| | | | | |
|---|---|---|---|---|
| 9,385,559 B2* | 7/2016 | Korekoda | ............ | B60L 53/122 |
| 9,608,480 B2* | 3/2017 | Lee | ...................... | H04B 5/0031 |
| 9,729,000 B2* | 8/2017 | Lee | ........................ | H02J 50/12 |
| 9,762,295 B2* | 9/2017 | Brandsma | ............ | H04B 5/0062 |
| 9,866,281 B2* | 1/2018 | Won | ........................ | H02J 50/40 |
| 9,923,603 B2* | 3/2018 | Won | ........................ | H02J 50/60 |
| 9,948,148 B2* | 4/2018 | Shichino | ................. | H02J 50/60 |
| 10,243,620 B2* | 3/2019 | Won | ........................ | H02J 50/10 |
| 10,483,809 B2* | 11/2019 | Shichino | ................. | H02J 50/60 |
| 10,581,491 B2* | 3/2020 | Won | ........................ | H02J 50/40 |
| 11,101,703 B2* | 8/2021 | Shichino | ................. | H02J 50/60 |
| 2006/0103535 A1* | 5/2006 | Pahlaven | ........... | G06K 7/10306 |
| | | | | 340/572.1 |
| 2012/0248891 A1* | 10/2012 | Drennen | .............. | H04B 5/0037 |
| | | | | 307/104 |
| 2013/0065518 A1* | 3/2013 | Byun | ...................... | H02J 50/12 |
| | | | | 455/39 |
| 2014/0312833 A1* | 10/2014 | Won | ........................ | H02J 50/90 |
| | | | | 320/108 |
| 2015/0244204 A1* | 8/2015 | Lee | ........................ | H02J 50/80 |
| | | | | 320/108 |
| 2017/0047784 A1* | 2/2017 | Jung | ....................... | G06F 1/206 |

\* cited by examiner

POWER TRANSMISSION APPARATUS, POWER RECEPTION APPARATUS, METHOD, AND RECORDING MEDIUM

CROSS-REFERENCE TO RELATED APPLICATIONS

This application is a Continuation of U.S. patent application Ser. No. 16/534,535 filed Aug. 7, 2019, which is a Continuation of International Patent Application No. PCT/JP2018/002405, filed Jan. 26, 2018, which claims the benefit of Japanese Patent Application No. 2017-021604, filed Feb. 8, 2017, which are hereby incorporated by reference herein in their entireties.

TECHNICAL FIELD

The present invention relates to a wireless power transfer system.

BACKGROUND ART

Currently, apparatuses having a wireless communication function and a wireless power transfer function are being studied. PTL 1 describes a power transmission apparatus that performs control communication when transmitting power from a power transmission coil, via the power transmission coil at a frequency the same as that of transmission power. Hereinafter, communication that is performed at a frequency the same as that of transmission power is called "in-band communication". PTL 2 describes a power transmission apparatus that performs control communication via an antenna different from a power transmission coil at a frequency different from that of transmission power. Hereinafter, communication that is performed at a frequency different from that of transmission power is called "out-band communication".

CITATION LIST

Patent Literature

PTL 1 Japanese Patent Laid-Open No. 2014-075857
PTL 2 Japanese Patent Laid-Open No. 2015-198562

Among a plurality of communication methods including in-band communication and out-band communication, a communication method that is appropriate for use in control communication can differ depending on the apparatus. Currently, a different power transmission apparatus needs to be used depending on a communication method that is used by the apparatus, which causes a problem of decreased convenience.

The present invention has been made in view of the above-described problem, and an object thereof is to provide a wireless power transfer system that allows the use of a plurality of communication methods in control communication while providing increased convenience.

SUMMARY OF INVENTION

A power transmission apparatus according to an aspect of the present invention includes: a power transmission unit; a first communication unit configured to communicate with a power reception apparatus; a second communication unit configured to communicate with the power reception apparatus at a radio frequency different from a radio frequency used by the first communication unit; and a deciding unit configured to make a decision as to whether to use the first communication unit or the second communication unit in communication for controlling wireless transmission of power by the power transmission unit, the decision being made on the basis of device information obtained from the power reception apparatus through communication by the first communication unit.

Further features of the present invention will become apparent from the following description of exemplary embodiments with reference to the attached drawings.

DESCRIPTION OF EMBODIMENTS

Hereinafter, embodiments of the present invention will be described with reference to the drawings. Note that embodiments described below are only examples for explanation, and at least some of the configurations concerning the following embodiments may be omitted, or further elements may be added. Further, the sequence of steps concerning a method in the following embodiments may be changed, some of the steps may be omitted, or additional steps may be used.

In a wireless power transfer system, a power transmission apparatus and a power reception apparatus can perform control communication by using, for example, either in-band communication in which communication is performed in a radio-frequency band the same as that for wireless power transfer or out-band communication in which communication is performed in a radio-frequency band different from that for wireless power transfer. Here, a power transmission apparatus according to this embodiment decides whether to perform control communication through in-band communication or perform control communication through out-band communication on the basis of information obtained from a power reception apparatus through in-band communication. At this time, the obtained information can be, for example, device information indicating whether the power reception apparatus is able to handle high-power wireless power transfer, indicating whether the power reception apparatus can perform out-band communication, or indicating other functions of the power reception apparatus. However, the information is not limited to these, and various types of information including the state of the power reception apparatus, etc. can be obtained. Accordingly, the power transmission apparatus can perform control communication using an appropriate method in accordance with, for example, the capabilities, state, etc. of the power reception apparatus. Note that in-band communication and out-band communication are examples and, for example, the power transmission apparatus has a first communication function that can be any communication function and a second communication function that can be any communication function and that uses a radio frequency different from that used by the first communication function, and can decide which of the communication functions is to be used on the basis of information obtained with the first communication function. At this time, the first communication function may use a radio frequency the same as that used in wireless power transfer or a radio frequency different from that used in wireless power transfer. That is, in the following description, in-band communication is used as an example of the first communication function, and out-band communication is used as an example of the second communication function; however, a technique described below is applicable in various forms.

Apparatus Configuration

Figure 1:
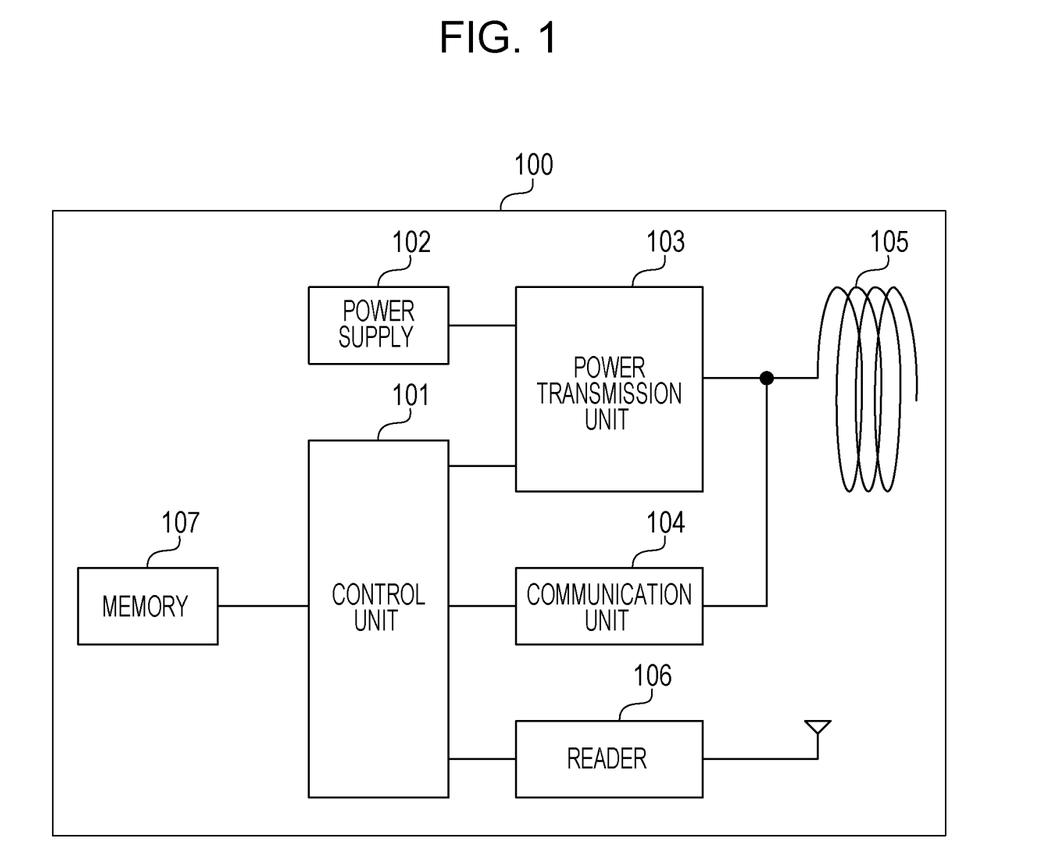
FIG. 1 is a block diagram illustrating an example configuration of a power transmission apparatus.

First, the configurations of apparatuses concerning this embodiment are described. FIG. 1 is a block diagram illustrating an example configuration of a power transmission apparatus 100 according to this embodiment. The power transmission apparatus 100 includes, for example, a control unit 101, a power supply 102, a power transmission unit 103, a communication unit 104, a power transmission coil 105, an RFID (Radio Frequency Identification) reader 106, and a memory 107.

The control unit 101 controls the entire apparatus by executing a control program stored in, for example, the memory 107. The control unit 101 can be constituted by, for example, one or more processors, such as a CPU (central processing unit), an ASIC (application-specific integrated circuit), an FPGA (field-programmable gate array), and a DSP (digital signal processor). The control unit 101 can also use the memory 107 when storing the value of a variable obtained while executing the control program. In the memory 107, the control program executed by the control unit 101 and other information are stored.

The power supply 102 supplies power to the power transmission unit 103 when the power transmission apparatus 100 performs wireless power transfer. The power supply 102 is, for example, a commercial power supply or a battery. The power transmission unit 103 transforms direct-current power or alternating-current power input from the power supply 102 to alternating-current power in a frequency band that is used in wireless power transfer and generates an electromagnetic wave to be sent via the power transmission coil 105. The power transmission unit 103 according to this embodiment operates in accordance with a standard developed by an organization for standardizing wireless charging, namely, Wireless Power Consortium (WPC), and a frequency in a 100 kHz band is used for the above-described alternating-current power. However, the power transmission unit 103 is not limited to this. The power transmission unit 103 may comply with a standard different from the WPC standard, and a frequency in a band other than a 100 kHz band may be used for the above-described alternating-current power. The power transmission unit 103 outputs, from the power transmission coil 105 on the basis of an instruction from the control unit 101, an electromagnetic wave for transmitting power to the counterpart device (for example, a power reception apparatus 200) in wireless power transfer. The power transmission unit 103 can control the intensity of the electromagnetic wave to be output by adjusting a voltage (power transmission voltage) or a current (power transmission current) to be input to the power transmission coil 105. When the power transmission voltage or the power transmission current is increased, the intensity of the electromagnetic wave to be sent increases accordingly. Further, the power transmission unit 103 can perform control for stopping transmission of power from the power transmission coil 105 on the basis of an instruction from the control unit 101.

The communication unit 104 performs, with a communication unit 204 of the power reception apparatus 200, control communication concerning wireless power transfer based on the WPC standard. Note that the communication unit 104 performs control communication through in-band communication that is performed at a frequency the same as that used in wireless power transfer. The communication unit 104 may transmit information by modulating the electromagnetic wave to be output from the power transmission coil 105. The communication unit 104 may receive information obtained through load modulation performed by the power reception apparatus that has received the electromagnetic wave output from the power transmission coil 105. Further, the communication unit 104 may perform communication other than the control communication as necessary. The reader 106 is, for example, an interrogator compliant with the ISO/IEC 18000-63 standard, which is an RFID standard for a UHF band (900 MHz band). The reader 106 can supply power for operating an RFID tag by continuously transmitting a carrier wave and can read information stored in a memory in the RFID tag and write information to the memory. The reader 106 performs control communication when the power transmission unit 103 transmits power to a power reception unit 205 of the power reception apparatus 200 through out-band communication in which communication is performed at a frequency different from that used in wireless power transfer.

Figure 2:
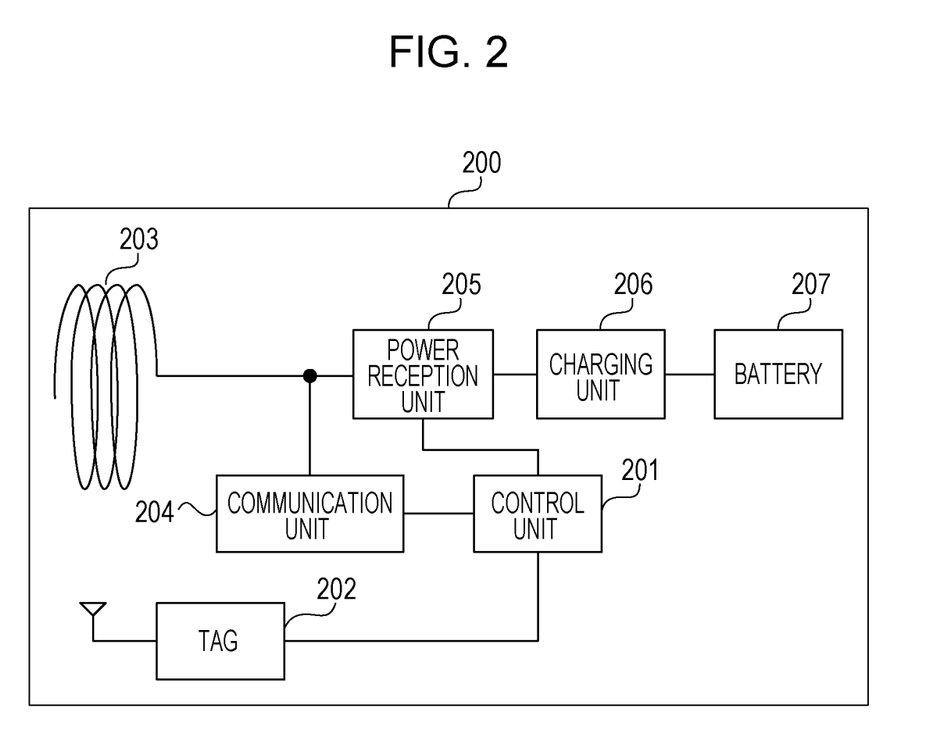
FIG. 2 is a block diagram illustrating an example configuration of a power reception apparatus.

FIG. 2 is a diagram illustrating an example configuration of the power reception apparatus 200 according to this embodiment. The power reception apparatus 200 includes, for example, a control unit 201, an RFID tag 202, a power reception coil 203, the communication unit 204, the power reception unit 205, a charging unit 206, and a battery 207.

The control unit 201 is, for example, connected to the tag 202, the communication unit 204, and the power reception unit 205 and controls the power reception apparatus 200 as a whole by executing a control program stored in, for example, a memory not illustrated. The control unit 201 can be constituted by, for example, one or more processors, such as a CPU (central processing unit), an ASIC (application-specific integrated circuit), an FPGA (field-programmable gate array), and a DSP (digital signal processor).

The tag 202 is an RFID tag for the UHF band (900 MHz band) that operates in accordance with a standard the same as that for the reader 106 of the power transmission apparatus 100. The tag 202 operates by using the carrier wave transmitted from the reader 106 as starting power and performs control communication when the power reception unit 205 receives power from the power transmission unit 103 of the power transmission apparatus 100, with the reader 106 through out-band communication.

The memory in the tag 202 is constituted by four memory banks (a UII memory or an EPC memory, a TID memory, a USER memory, and a RESERVED memory). Here, UII is an acronym for Unique Item Identifier, EPC is an acronym for Electrical Product Code, and TID is an acronym for Tag Identifier. In the UII memory or the EPC memory, a UII or an EPC, which is identification information of a product in which the tag is mounted, is stored. In the TID memory, an identification code, etc. of the manufacturer of the tag is stored. In the USER memory, information that can be used by the user of the tag as desired is stored. In the RESERVED memory, a password for accessing each memory bank, a password for invalidating the chip, etc. can be stored. In RFID, the reader can perform read/write to/from the memory in the tag in three stages of select, inventory, and access. In the inventory stage among these stages, the reader can obtain some of the pieces of information, such as the UII or the EPC, etc., stored in the memory area of the tag.

The communication unit 204 performs, with the communication unit 104 of the power transmission apparatus 100, control communication for wireless power transfer based on the WPC standard through in-band communication. The communication unit 204 may obtain information by demodulating the modulated electromagnetic wave from the power transmission apparatus 100. Further, the communication unit 204 may vary a load of the communication unit 204 and transmit information through the load modulation. Note that the communication unit 204 may perform communication other than the control communication as necessary. The power reception unit 205 receives power transmitted by the power transmission unit 103 of the power transmission apparatus 100 via the power reception coil 203, transforms the power to a direct-current voltage, and supplies the direct-current voltage to the charging unit 206. The power reception coil 203 and the power reception unit 205 are configured so as to be capable of taking power from the electromagnetic wave sent from an apparatus, such as the power transmission apparatus 100, that operates in accordance with the WPC standard. The charging unit 206 controls charging of the battery 207 with the direct-current voltage supplied from the power reception unit 205.

Note that the power transmission apparatus 100 and the power reception apparatus 200 may be apparatuses that perform only wireless power transfer; however, the power transmission apparatus 100 and the power reception apparatus 200 may be, for example, image input apparatuses, such as image capturing apparatuses (cameras, video cameras, etc.) or scanners, or can be image output apparatuses, such as printers, copiers, or projectors. Further, the power transmission apparatus 100 and the power reception apparatus 200 may be storage devices, such as hard disk devices or memory devices, or information processing apparatuses, such as personal computers (PCs) or smartphones. That is, the power transmission apparatus 100 and the power reception apparatus 200 can be any electronic devices having a function of performing wireless power transfer. In this case, for example, the output destination of power received by the power reception unit 205 need not be the charging unit 206. For example, the power reception unit 205 may be directly connected to a predetermined circuit in an electronic device, which can be the power reception apparatus 200, and the received power may be supplied to the circuit.

Process Flow

Figure 3A:
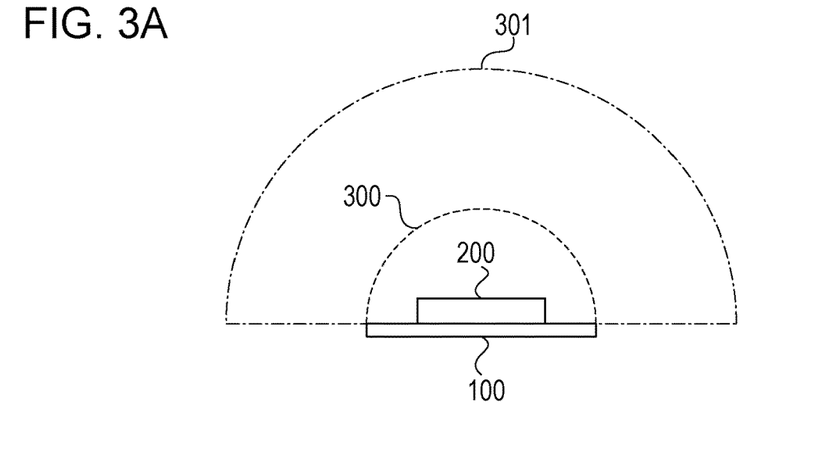
FIG. 3A is a diagram illustrating an example system configuration.
Figure 4:
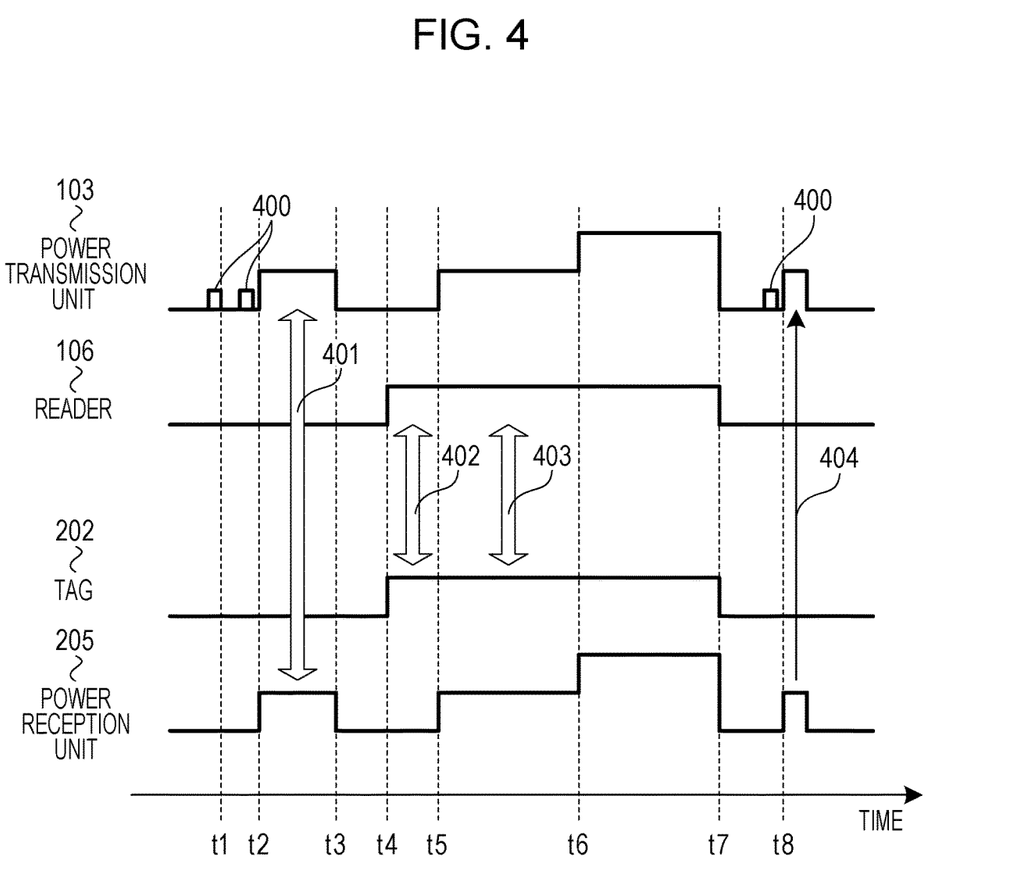
FIG. 4 is a time chart illustrating a state of communication in a system.
Figure 5:
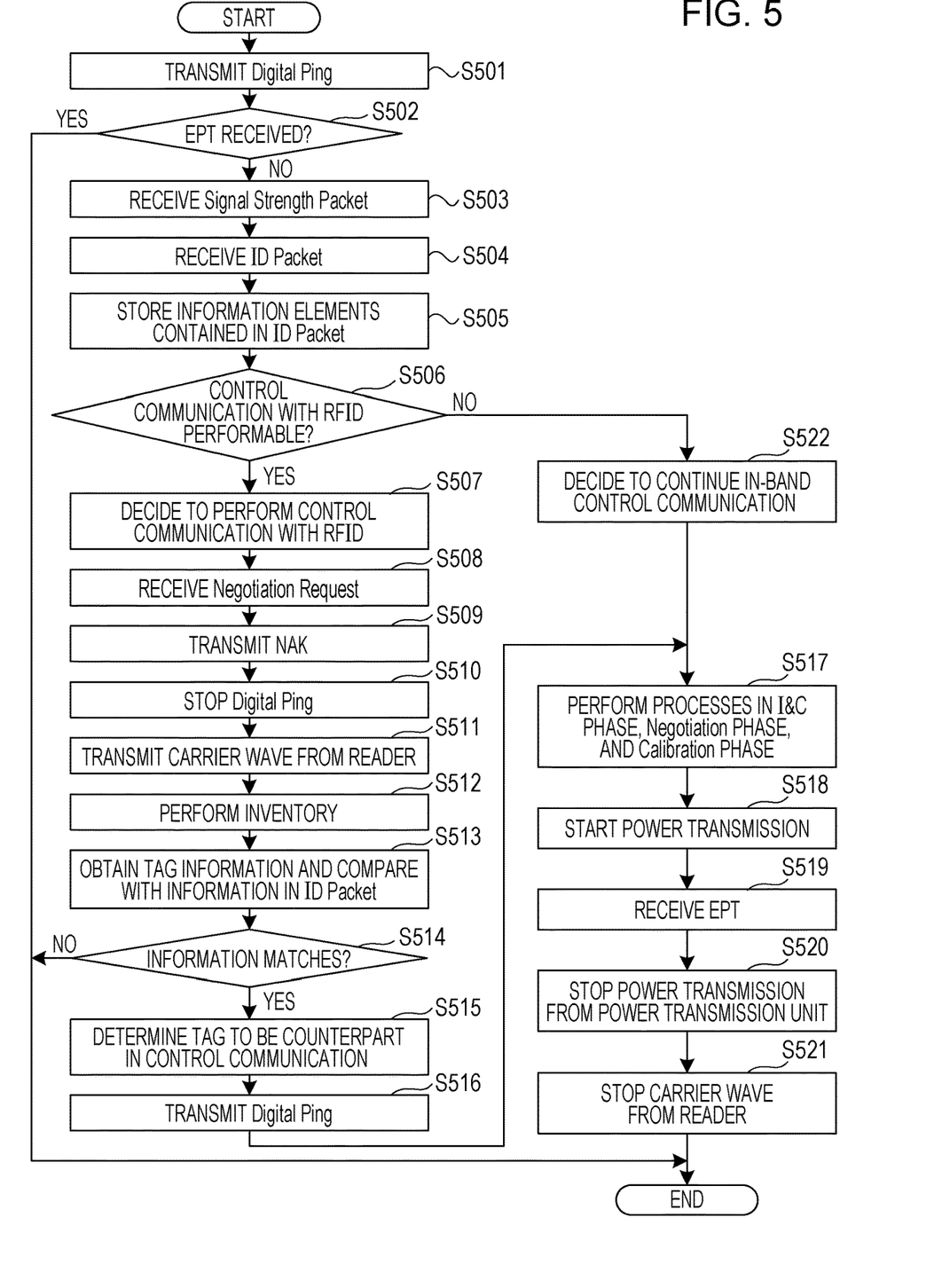
FIG. 5 is a flowchart illustrating an example flow of processing that is performed by the power transmission apparatus.
Figure 6:
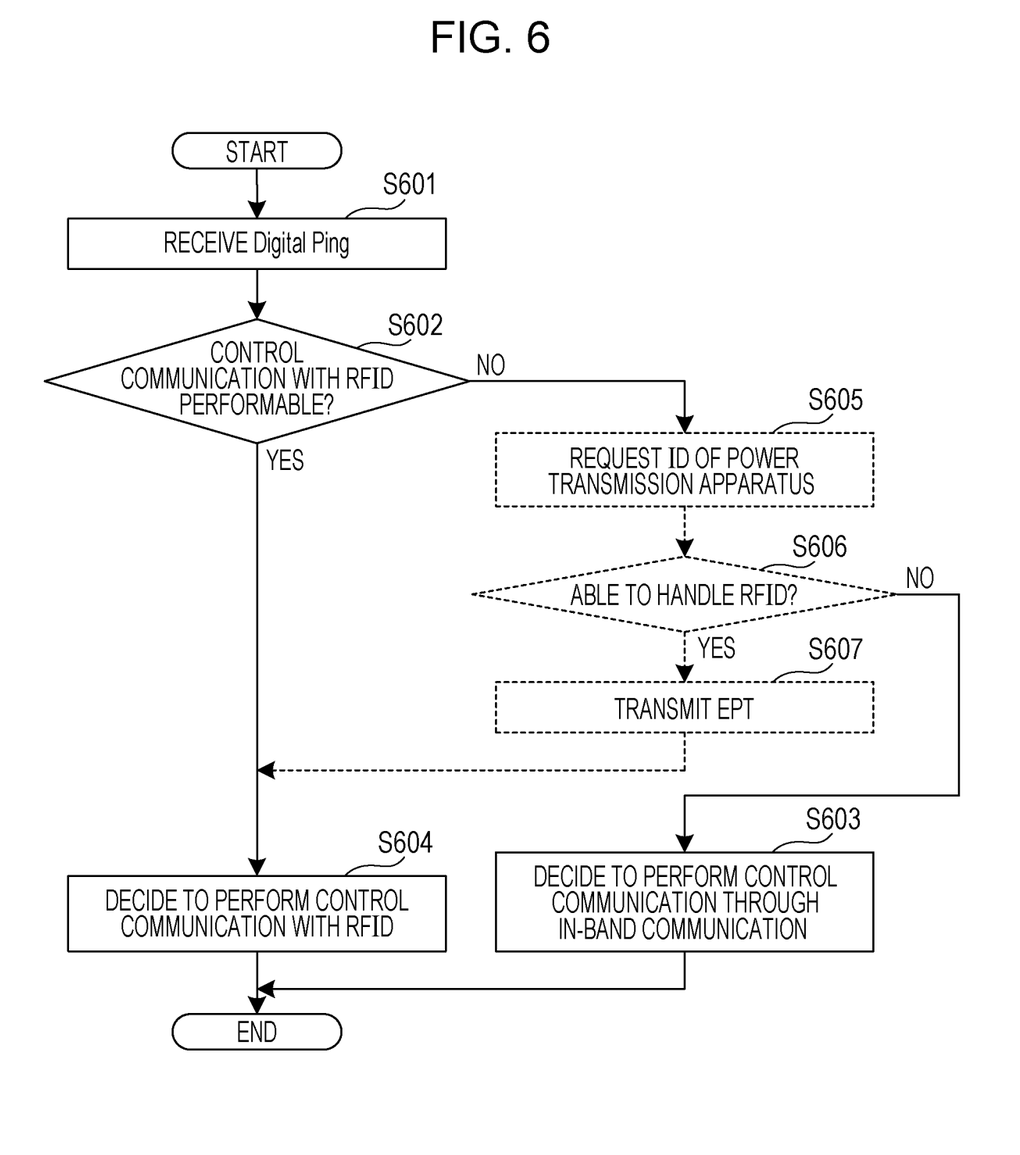
FIG. 6 is a flowchart illustrating an example flow of processing that is performed by the power reception apparatus.

Now, a process flow in a system state as illustrated in FIG. 3A is described with reference to FIG. 4 to FIG. 6. Here, FIG. 3A illustrates a state where the power reception apparatus 200 is placed on the power transmission apparatus 100. The dashed line 300 illustratively indicates the power transmission range (active area, Operating Volume) of the power transmission unit 103 and the in-band communication range of the communication unit 104. The dashed dotted line 301 illustratively indicates the out-band communication range of the reader 106. As illustrated in FIG. 3A, the out-band communication range is wider than the in-band communication range. FIG. 4 is a time chart illustrating the overall flow of processing that is performed in the power transmission unit 103 and the reader 106 of the power transmission apparatus 100 and in the tag 202 and the power reception unit 205 of the power reception apparatus 200 according to this embodiment. In FIG. 4, the horizontal axis represents the time, and the vertical axis represents the power in each of the power transmission unit 103, the reader 106, the tag 202, and the power reception unit 205. FIG. 5 is a flowchart illustrating an example flow of processing that is performed by the power transmission apparatus 100, and FIG. 6 is a flowchart illustrating an example flow of processing that is performed by the power reception apparatus 200. Note that a process in steps outlined by the dotted line in FIG. 6 is an optional process and need not be performed. That is, for example, in a case where determination in S602 in FIG. 6 results in NO, the process in S603 can be performed while the process in the steps outlined by the dotted line is omitted. First, such a case where the optional process is not performed is described below, and thereafter, the optional process is described.

Hereinafter, a description is given of (1) a case where out-band communication is used, and thereafter, a description is given of (2) a case where out-band communication is not used, with reference to the time chart in FIG. 4.

(1) Case where Out-Band Communication is Used

Time t1 to Time t2

The power transmission unit 103 performs an operation specified for the Selection phase in the WPC standard from time t1 to time t2. The Selection phase is a phase in which the power transmission apparatus 100 detects an object. In this phase, the power transmission unit 103 periodically transmits an Analog Ping 400, which is a very low power for detecting an object placed on the power transmission apparatus 100. In a case where an object is present within the power transmission range indicated by the dashed line 300, the voltage of the power transmission coil 105 when the Analog Ping is transmitted becomes lower than that in a case where an object is not present within the range. Accordingly, the power transmission unit 103 can detect the presence of an object within the power transmission range by monitoring the voltage of the power transmission coil 105. Here, it is assumed that the power reception apparatus 200 is placed on the power transmission apparatus 100 and that the power transmission unit 103 detects the object at time t2 and makes a notification to the control unit 101. In response to this, the power transmission apparatus 100 transitions from the Selection phase to the Ping phase and starts the processing in FIG. 5. Note that the processing in FIG. 5 can be started when, for example, the control unit 101 executes a program stored in the memory 107. On the other hand, the power reception apparatus 200 can start the processing in FIG. 6 in a case where the power reception unit 205 is powered up. For example, in a case of power-up or in response to turning on of a wireless power transfer function in the power reception apparatus 200, the processing in FIG. 6 can be started. Alternatively, in response to receipt of a Digital Ping in S601 in FIG. 6, the control unit 201 and the power reception unit 205 of the power reception apparatus 200 may be started, and the subsequent processing may be performed. Note that, during the period from time t1 to time t2, the reader 106 of the power transmission apparatus 100 does not send a carrier wave.

Time t2 to Time t3

From time t2 to time t3, the Ping phase, the Identification & Configuration (I&C) phase, and the Negotiation phase in the WPC standard are performed. Here, state transitions defined by the WPC standard are described.

In the Ping phase, the power transmission unit 103 transmits a Digital Ping. The Digital Ping is power for powering and starting up the power reception unit 205 and performing in-band communication and has a power higher than that of the Analog Ping. In the Ping phase, the power reception apparatus 200 transmits a Signal Strength (SS) Packet, which is a packet containing the voltage value of the received Digital Ping. When the power transmission apparatus 100 receives this packet, the processing proceeds to the I&C phase.

In the I&C phase, the power reception unit 205 transmits identification information to the power transmission unit 103 as an Identification (ID) Packet. Thereafter, the power reception unit 205 transmits a Configuration Packet that contains information including the maximum value of power to be supplied to a load (in this case, the charging unit 206). Thereafter, the power reception unit 205 transmits a Negotiation Request Packet for proceeding to the Negotiation phase. When the power transmission unit 103 transmits an ACK indicating acknowledgment for the Negotiation Request Packet, the processing proceeds to the Negotiation phase. Note that, in a case where the power transmission unit 103 transmits a NAK indicating negative acknowledgment for the Negotiation Request Packet, the power transmission unit 103 stops transmitting the Digital Ping, and the processing returns to the Selection phase.

Figure 7:
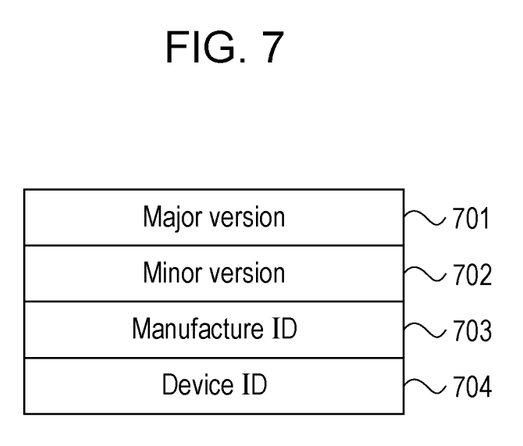
FIG. 7 is a diagram illustrating an example structure of identification information.

The identification information transmitted by the power reception unit 205 in the I&C phase has a structure as illustrated in, for example, FIG. 7. In FIG. 7, Major Version 701 and Minor Version 702 indicate a version of the WPC standard. For example, for version 1.2 of the WPC standard, Major Version 701 is set to "1" and Minor Version 702 is set to "2". The WPC standard version 1.2 is a standard for transmitting a low power (15 watts at the maximum). This embodiment assumes that, in control communication concerning power transfer based on this standard, in-band communication is used. Further, this embodiment assumes that, in a case of using a standard for transmitting a high power of, for example, 50 watts at the maximum (hereinafter referred to as a high-power standard) in control communication concerning power transfer, out-band communication is used. Manufacture ID 703 indicates an identification number indicating the manufacturer of the power reception unit 205 or the power reception apparatus 200, and Device ID 704 indicates the individual identification number of the power reception unit 205 or the power reception apparatus 200. The combination of Manufacture ID 703 and Device ID 704 of a certain apparatus does not match the combination of Manufacture ID 703 and Device ID 704 of any other apparatus. Hereinafter, the combination of Manufacture ID 703 and Device ID 704 is called individual identification information. This embodiment assumes that the identification information as illustrated in FIG. 7 is stored in the memory area of the tag 202 as a UII or an EPC.

In the Negotiation phase, negotiation on power to be transmitted and received is conducted between the power transmission unit 103 and the power reception unit 205. In response to conclusion of this negotiation, the processing proceeds to the Calibration phase. The Calibration phase is not related to the following description, and therefore, a description thereof is omitted here. In the Calibration phase, processing generally performed by a device that performs WPC wireless power transfer is performed. After the end of the Calibration phase, the processing proceeds to the Power Transfer (PT) phase in which the power reception unit 205 supplies power to the load. In a case where the power transmission unit 103 transmits an ACK to the power reception unit 205 in the Calibration phase, the processing proceeds to the PT phase. In a case where the power transmission unit 103 transmits a NAK, the processing remains in the Calibration phase.

Note that the arrow 401 in FIG. 4 indicates that in-band communication is performed between the power transmission unit 103 and the power reception unit 205 from the Ping phase to the Negotiation phase.

In this period, as described above, the power transmission unit 103 of the power transmission apparatus 100 transmits a Digital Ping (S501) at time t2, when the control unit 101 of the power transmission apparatus 100 detects an object (the power reception apparatus 200).

When receiving the Digital Ping (S601), the control unit 201 of the power reception apparatus 200 is started by the supplied power of the Digital Ping and determines whether the battery 207 needs to be charged. This determination is performed in accordance with, for example, whether the remaining power of the battery 207 is equal to or higher than a predetermined value. In a case where the control unit 201 determines that charging is not necessary, the power reception unit 205 transmits an End Power Transfer (EPT), which is a message indicating that power transmission is to be stopped, to the power transmission unit 103 through in-band communication. Here, it is assumed that the control unit 201 determines that charging is necessary and that the power reception unit 205 does not transmit an EPT. The control unit 201 of the power reception apparatus 200 transmits an SS Packet, an ID Packet, and a Configuration Packet to the power transmission apparatus 100.

Subsequently, the control unit 201 of the power reception apparatus 200 determines whether control communication with RFID is performable (S602). For example, the control unit 201 attempts to access the memory in the tag 202 through wired communication, such as I2C (Inter-Integrated Circuit). In a case where the access is successful, the control unit 201 determines that the tag is activated and control communication with RFID is performable. In a case where the access fails, the control unit 201 determines that control communication with RFID is not performable. In FIG. 4, the reader 106 does not transmit a carrier wave during the period from time t2 to time t3, and the tag 202 is not activated. Accordingly, the control unit 201 fails to access the tag 202, and therefore, determines that control communication with RFID is not performable (NO in S602) and decides to perform control communication not with RFID but through in-band communication (S603).

In the power transmission apparatus 100, the power transmission unit 103 does not receive an EPT (NO in S502) and receives the SS Packet and the ID Packet (and the Configuration Packet) (S503 and S504). The control unit 101 stores information elements contained in the ID Packet in the memory 107 (S505). The control unit 101 determines whether control communication with RFID is performable (S506). Note that determination as to whether control communication with RFID is performable can be determination as to whether a high power is transmittable. For example, the control unit 101 can check whether the power reception apparatus 200 is able to handle control communication using RFID on the basis of the identification information, as illustrated in FIG. 7, contained in the ID Packet. Here, it is assumed that the power reception apparatus 200 complies with the high-power standard and control communication using RFID is possible. In this case, the communication unit 204 of the power reception apparatus 200 includes, for example, information indicating the high-power standard as Major Version and Minor Version in the ID Packet and transmits the ID Packet. The control unit 101 of the power transmission apparatus 100 determines from the ID Packet that control communication with RFID can be performed with the power reception apparatus 200 (Yes in S506) and decides to perform control communication not through in-band communication but through communication with RFID (S507). In this case, the power transmission apparatus 100 performs a process for switching the control communication from in-band communication to out-band communication. In this embodiment, the power transmission unit 103 of the power transmission apparatus 100 stops the Digital Ping, and the control sequence using in-band communication ends accordingly. For example, when the power transmission apparatus 100 receives the Negotiation Request Packet transmitted from the power reception apparatus 200 (S508), the power transmission apparatus 100 transmits a NAK as a response to the Negotiation Request Packet (S509). After transmission of the NAK, the power transmission apparatus 100 stops the Digital Ping at time t3 (S510). Note that, in this case, when the power transmission apparatus 100 transmits a Digital Ping again, the power transmission apparatus 100 controls the transmission through out-band communication, as described below.

Time t3 to Time t4

During this period, the power transmission unit 103 of the power transmission apparatus 100 suspends transmission of a Digital Ping, and therefore, the control unit 201 and the power reception unit 205 of the power reception apparatus 200 are unable to receive driving power and are in a power-off state.

Time t4 to Time t5

During the period from time t4 to time t5, the reader 106 of the power transmission apparatus 100 detects the tag 202 of the power reception apparatus 200 and enters a state where the reader 106 can perform read/write to/from the memory in the tag 202. Specifically, the control unit 101 of the power transmission apparatus 100 causes the reader 106 to transmit a carrier wave to start supply of driving power to the tag 202 of the power reception apparatus 200 (S511), and the tag 202 receives this carrier wave and is activated. The reader 106 performs an inventory process (S512). In the inventory process, the reader 106 first transmits a Query command to the tag 202. The tag 202 transmits an RN16, which is a 16-bit random bit string, to the reader 106 as a response to the command. The reader 106 transmits an ACK (RN16) that contains the RN16 to the tag 202. When receiving the ACK (RN16), the tag 202 transmits, to the reader 106, a UII or an EPC, which is identification information of a product (that is, the power reception apparatus 200) in which the tag 202 is mounted. The reader 106 transmits a Req_RN command, which is a command for requesting "Handle", which is a 16-bit authentication number that is used when read/write to/from the memory in the tag 202 is performed, to the tag 202. The tag 202 transmits the Handle to the reader 106. With this process, the reader 106 is allowed to perform read/write to/from the memory in the tag 202.

Note that the arrow 402 in FIG. 4 indicates out-band communication between the tag 202 and the reader 106. Note that, also from time t4 to time t5, the power transmission unit 103 does not transmit a Digital Ping, and the control unit 201 and the power reception unit 205 of the power reception apparatus 200 remain in a power-off state.

When obtaining the identification information (UII or EPC) from the tag 202, the control unit 101 of the power transmission apparatus 100 compares the identification information with the identification information of the power reception apparatus 200 stored in the memory 107 in S505 (S513). Note that, here, identification information the same as the identification information contained in the ID Packet is stored in the memory area (UII or EPC) of the tag, and therefore, the identification information included in the UII or the EPC matches the identification information contained in the ID Packet (Yes in S514). Accordingly, the control unit 101 of the power transmission apparatus 100 can determine that the power reception apparatus 200 in which the tag 202 that performs out-band communication during the period from time t4 to time t5 is mounted is the same as the power reception apparatus 200 that performs in-band communication during the period from time t2 to time t3. Consequently, the control unit 101 of the power transmission apparatus 100 determines the tag 202 from which the identification information is obtained to be the counterpart in control communication using the reader 106 (S515).

Note that, in determination in S514, the identification information contained in the ID Packet need not exactly match the identification information stored in the memory 107, and it is sufficient that these pieces of identification information have a predetermined correspondence indicating that the pieces of identification information are information concerning the same power reception apparatus 200. For example, the identification information contained in the ID Packet is used as an argument, and a calculation using a predetermined function that returns different results for different arguments is performed. In a case where a value obtained as a result of the calculation is the same as the value of the identification information stored in the memory 107, the pieces of identification information can be determined to have a predetermined correspondence.

Time t5 to Time t6

The control unit 101 of the power transmission apparatus 100 performs a WPC sequence through out-band communication. The arrow 403 in FIG. 4 indicates control communication based on the WPC standard using the communication, between the reader 106 and the tag 202, that becomes possible as indicated by the arrow 402, and corresponds to control from the Ping phase to a phase immediately before the PT phase. In the control performed here, first, the control unit 101 of the power transmission apparatus 100 causes the power transmission unit 103 to transmit a Digital Ping (S516). When the control unit 201 of the power reception apparatus 200 receives the Digital Ping (S601), the control unit 201 of the power reception apparatus 200 determines whether control communication with RFID is performable as in the above-described case (S602). Here, the tag 202 receives the carrier wave from the reader 106 and is activated, and therefore, the control unit 201 can access the memory in the tag 202 through, for example, wired communication, such as I2C. Accordingly, the control unit 201 determines that control communication with RFID is performable (YES in S602) and decides to perform control communication with RFID (S604).

The control unit 101 of the power transmission apparatus 100 performs processes in the I&C phase, the Negotiation phase, and the Calibration phase as described above through out-band communication between the reader 106 and the tag 202 (S517). Note that, here, unlike in S509, the control unit 101 of the power transmission apparatus 100 transmits an ACK to the Negotiation Request transmitted from the power reception apparatus 200. This is because at the time point when the Negotiation Request is received, control communication is performed through out-band communication, and switching from in-band communication to out-band communication need not be performed.

Time t6 to Time t7

During this period, the processing proceeds to the PT phase, and the control unit 101 of the power transmission apparatus 100 controls and causes the power transmission unit 103 to transmit power to the power reception unit 205 (S518). Note that, during the period, the reader 106 is transmitting the carrier wave to the tag 202, and driving power is supplied to the tag 202 from the reader 106 for control communication using RFID simultaneously with power supply by the power transmission unit 103 concerning wireless power transfer.

Note that, in control communication from time t5 to time t7, the USER memory in the memory area of the RFID tag is used.

Time t7 to Time t8

When charging of the battery 207 is completed at time t7, the power reception apparatus 200 transmits an EPT. When the control unit 101 of the power transmission apparatus 100 receives the EPT (S519), the control unit 101 of the power transmission apparatus 100 stops power transmission from the power transmission unit 103 (S520) and controls and causes the reader 106 to stop transmitting the carrier wave (S521). That is, the control unit 101 stops supply of driving power from the reader 106 to the tag 202 in response to stopping of power transmission from the power transmission unit 103. After stopping power transmission from the power transmission unit 103, the control unit 101 of the power transmission apparatus 100 performs the Selection phase described above. That is, the power transmission unit 103 periodically transmits an Analog Ping. In this case, the power reception apparatus 200 remains placed on the power transmission apparatus 100, and therefore, the control unit 101 of the power transmission apparatus 100 transmits a Digital Ping at time t8. However, in this case, charging of the battery 207 is completed, and therefore, the control unit 201 of the power reception apparatus 200 transmits an EPT to the power transmission apparatus 100 (the arrow 404 in FIG. 4). Note that the reader 106 stops sending the carrier wave at time t7, and therefore, this control communication is performed not with RFID but through in-band communication.

As described above, the power transmission apparatus can determine whether the power reception apparatus is able to use out-band communication on the basis of device information contained in, for example, an ID Packet, etc. received from the power reception apparatus. Accordingly, the power transmission apparatus can perform wireless power transfer appropriately (for example, at a high power) with the power reception apparatus that is able to use out-band communication.

(2) Case where Out-Band Communication is not Used

The control unit 101 of the power transmission apparatus 100 receives the ID Packet from the power reception apparatus 200 through in-band communication from time t2 to time t3 (S504). In this case, in a case where, for example, information in the ID Packet is information indicating compliance with WPC 1.2, the control unit 101 determines that control communication with RFID is not performable (NO in S506), and decides to continue the control communication through in-band communication (S522). Thereafter, the control unit 101 performs the control communication, which is performed through out-band communication from time t5 to t8 in the above-described case, through in-band communication.

As described above, the power transmission apparatus can determine whether the power reception apparatus is an apparatus for which in-band communication is to be used on the basis of device information contained in, for example, an ID Packet, etc. received from the power reception apparatus. Accordingly, the power transmission apparatus can perform wireless power transfer appropriately also with the power reception apparatus for which in-band communication is to be used.

In a case where the power transmission apparatus 100 is performing in-band communication, the power reception apparatus 200 of this embodiment performs in-band communication accordingly (from time t2 to time t3). In a case where the power transmission apparatus 100 is performing out-band communication, the power reception apparatus 200 of this embodiment performs out-band communication accordingly (from time t4 to time t7). As described above, the power reception apparatus 200 selects a method of control communication in accordance with the operation of the power transmission apparatus 100. Accordingly, even in a case where the power transmission apparatus 100 is able to handle only in-band communication, the power reception apparatus 200 can perform control communication with the power transmission apparatus 100.

As described above, the power transmission apparatus 100 according to this embodiment can perform control communication even if the power reception apparatus 200 is able to handle either out-band communication or in-band communication, and convenience of the wireless power transfer system can be increased.

The reader 106 of the power transmission apparatus 100 according to this embodiment transmits a carrier wave during a period (for example, from time t4 to time t7) in which the power reception apparatus that is able to handle RFID is present within the power transmission range and in which charging is needed. Accordingly, the power consumption of the power transmission apparatus 100 can be made lower and radio interference with a nearby radio system can be made smaller than those in a case where the reader 106 continuously transmits a carrier wave during the period from time t1 to time t8. Note that the reader 106 may continuously transmit a carrier wave in a steady manner.

From the viewpoint of power saving and reduction in radio interference, the time period during which the reader transmits a carrier wave can be made shorter to the extent possible. That is, power transmission may be started after confirmation that RFID can be used and may be immediately stopped when control communication with RFID is not necessary any more. In this embodiment, the reader 106 starts transmitting a carrier wave after it has been determined that the power reception apparatus 200 can perform control communication using RFID, and promptly stops the carrier wave when an EPT is received at time t7. Accordingly, the time period during which the reader 106 transmits a carrier wave can be limited to a minimum necessary time period.

The control unit 101 of the power transmission apparatus 100 performs control to start transmission of a Digital Ping at time 5 in a state where the reader 106 can perform read/write to/from the tag 202, that is, the reader 106 can perform control communication, from time t4 to time t5. Accordingly, stable power transmission control can be performed using RFID. In a case where, for example, the power transmission unit 103 transmits a Digital Ping at time t4, the reader 106 is not in a state where read/write to/from the tag 202 is possible, and therefore, it might not be possible to perform power transmission control from time t4 to time t5. However, with this embodiment, such a state can be avoided.

Figure 3B:
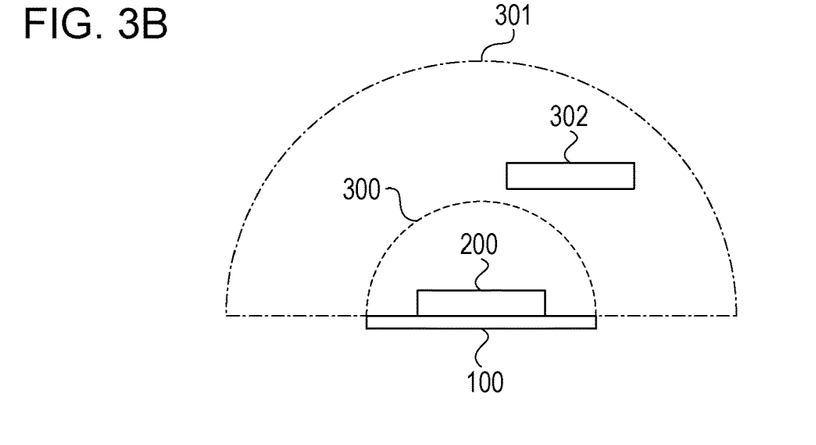
FIG. 3B is a diagram illustrating an example system configuration.

Further, as described above, the control unit 101 of the power transmission apparatus 100 selects a tag that is the counterpart for reading and writing on the basis of identification information of the power reception apparatus received through in-band communication and identification information received through out-band communication (the period from time t3 to time t4, NO in S514). Accordingly, the power transmission apparatus 100 can appropriately select and communicate with a counterpart apparatus (the power reception apparatus 200) in wireless power transfer. For example, as illustrated in FIG. 3B, it is assumed that the tag 202 (the tag of the power reception apparatus 200) compliant with the WPC standard and a tag 302 not compliant with the WPC standard are present around the power transmission apparatus 100. In this case, the power transmission apparatus 100 obtains pieces of identification information of both the tag 202 of the power reception apparatus 200 and the tag 302 in S513. At this time, the power transmission apparatus 100 compares the obtained pieces of identification information with the identification information obtained through in-band communication in S505 and does not select the tag 302 as a target of access with RFID (NO in S514). Even in a case where the tag 302 is included in another power reception apparatus that complies with the high-power standard, the power transmission apparatus 100 has not obtained identification information of the other power reception apparatus through in-band communication, and therefore, does not select the tag 302 as a target of access with RFID. At least individual identification information including Manufacture ID and Device ID of the tag 302 is different from the individual identification information of the power reception apparatus 200 obtained through in-band communication, and therefore, the power transmission apparatus 100 can distinguish the tag 302 and the tag 202 from each other.

Figure 3C:
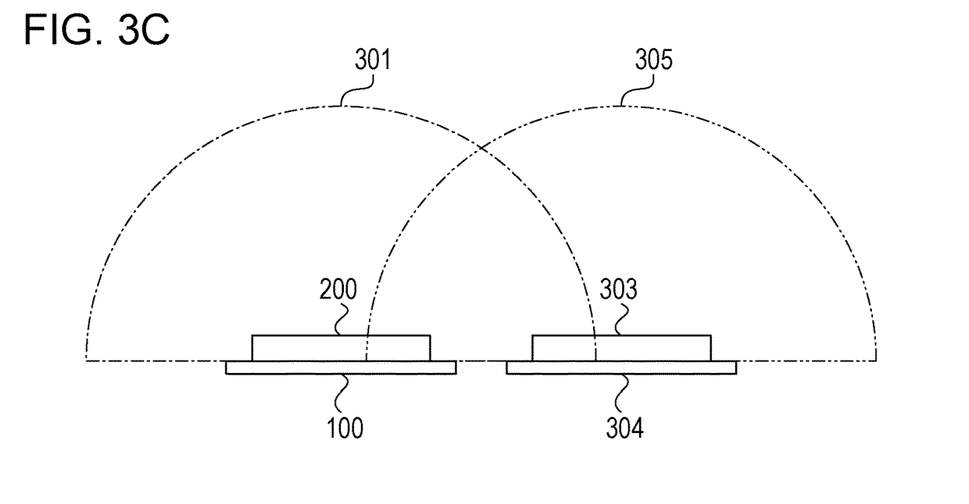
FIG. 3C is a diagram illustrating an example system configuration.

Even in a case where wireless power transfer systems are adjacent to each other as illustrated in FIG. 3C, the control unit 101 of the power transmission apparatus 100 selects a tag to which the power transmission apparatus 100 is to be connected on the basis of individual identification information so that the power transmission apparatus 100 can appropriately select an access target tag. In FIG. 3C, a power transmission apparatus 304 and a power reception apparatus 303 are present adjacent to the system as illustrated in FIG. 3A, and the out-band communication range of the power transmission apparatus 304 is indicated by the double-dotted chain line 305. In FIG. 3C, the reader 106 of the power transmission apparatus 100 and the reader of the power transmission apparatus 304 can communicate with the tags of both the power reception apparatus 200 and the power reception apparatus 303. However, the in-band communication range of the power transmission apparatus 100 and that of the power transmission apparatus 304 do not overlap. Accordingly, the power transmission apparatus 100 and the power transmission apparatus 304 can perform out-band communication using RFID with the power reception apparatus 200 and the power reception apparatus 303 respectively on the basis of respective pieces of individual identification information obtained through in-band communication.

Note that, this embodiment assumes that a receipt error does not occur in control communication with RFID (403 and S517), and the description is given. There may be a case where an error occurs due to, for example, the radio environment. In such a case, the power transmission apparatus 100 may perform switching so as to perform control communication through in-band communication. Note that, in this case, for example, a power that can be transmitted through wireless power transfer is not 50 watts, which is specified in the high-power standard using out-band communication, but can be limited to 15 watts, which is specified in the WPC standard 1.2 using in-band communication.

In an example of in-band communication, a transmission power waveform is subjected to load modulation to change the voltage amplitude by a very small amount, thereby making control data be superimposed. In the transmission and reception coils, the voltage amplitude varies to a larger degree at a high power than a low power, and therefore, it is difficult to detect a very small amount of change in the voltage amplitude due to load modulation at the time of power transmission at a high power. As a result, if in-band communication is used at the time of power transmission at a high power, transmission and reception of control data may fail, and the wireless power transfer system may become unstable. For this, in a case where out-band communication is not possible, communication is changed to in-band communication as described above, and the value of power to be transmitted is changed to the upper limit in in-band communication, thereby enable stable power transmission and control communication.

The identification information (FIG. 7) of the power reception apparatus of this embodiment is stored in the UII or EPC memory in the memory area of the tag 202; however, the identification information may be stored in the TID memory or the USER memory. Here, in a case of storing the identification information in the UII memory, the EPC memory, or the USER memory, setting may be performed so as not to allow writing by the reader 106. Accordingly, it is possible to prevent intentional rewriting of the identification information by a malicious reader.

In this embodiment, the example is described in which the power transmission apparatus 100 decides to switch from in-band communication to out-band communication on the basis of identification information of the power reception apparatus 200. However, this embodiment is not limited to this, and the power reception apparatus 200 may decide to switch from in-band communication to out-band communication on the basis of identification information of the power transmission apparatus 100. This can be performed, for example, in the process from S605 to S607 in FIG. 6, which is indicated as the optional process.

In a case where the optional process is performed, the power reception apparatus 200 transmits a Negotiation Request from time t2 to time t3. When the power transmission apparatus 100 transmits an ACK for the Negotiation Request, the processing proceeds to the Negotiation phase. In the Negotiation phase, the power reception apparatus 200 transmits, to the power transmission apparatus 100, a message for requesting identification information (ID) of the power transmission apparatus 100 (S605). In the Negotiation phase, the power reception apparatus can transmit a General Request Packet for making various requests to the power transmission apparatus. In the General Request Packet, the specifics of the above-described request can be specified in the packet header. For example, when the power reception apparatus sets the value of the header to 0x30, the power reception apparatus can transmit a request for transmitting Power Transmitter Identification. By making this request, the power reception apparatus can obtain information concerning the power transmission apparatus similar to that in FIG. 7. On the basis of the identification information of the power transmission apparatus obtained in S605, the power reception apparatus determines whether the power transmission apparatus implements RFID, that is, whether the power transmission apparatus complies with, for example, the high-power standard (S606). If the power reception apparatus determines that the power transmission apparatus is able to perform control communication with RFID (YES in S606), the power reception apparatus decides to perform control communication with RFID (S604). Note that, in this case, the power reception apparatus may transmit an EPT (S607), and the wireless power transfer processing may return to the Selection phase. Also with the process as described above, control communication concerning wireless power transfer can be performed between the power transmission apparatus and the power reception apparatus by using an appropriate communication method.

Note that the power transfer method used in the wireless power transfer system is not specifically limited. For example, a magnetic field resonance method can be used in which power is transferred though coupling due to resonance of a magnetic field between the resonator (resonant element) of the power transmission apparatus and the resonator (resonant element) of the power reception apparatus; however, an electromagnetic induction method, an electric field resonance method, a microwave method, a laser, etc. may be used.

In the above-described embodiment, the example case is described in which, as the interface for performing out-band communication, the RFID interface in the UHF band is used; however, the embodiment is not limited to this. For example, an interface compliant with the Bluetooth (registered trademark) Low Energy (BLE) standard or the Wireless Fidelity (Wi-Fi (registered trademark)) standard may be used as the interface for performing out-band communication.

In a case of using the BLE standard, the reader 106 of the power transmission apparatus 100 can communicate as a Central (control station) in the BLE standard, and the tag 202 of the power reception apparatus 200 can communicate as a Peripheral (sub-station) in the BLE standard. When the power reception apparatus 200 recognizes that the power transmission apparatus is able to handle control communication using the BLE standard in S606, the power reception apparatus 200 can transmit an Advertise packet containing the information elements in FIG. 7 to the power transmission apparatus in S607. The Advertise packet is a packet for the Peripheral to transmit its own information. The power transmission apparatus 100 determines the power reception apparatus 200 that is present within the power transmission range to be the communication counterpart in control communication in the above-described process in S513 and S514, and transmits a Connect packet to the power reception apparatus 200. Here, the Connect packet is a packet for establishing a wireless connection with the Peripheral that has transmitted the Advertise packet, and is specified in the BLE standard. In this way, an effect similar to that obtained in the above-described processing can be obtained.

In a case of using the Wi-Fi (registered trademark) standard, the power transmission apparatus 100 can function as an access point, and the power reception apparatus 200 can function as a station. In this case, the power reception apparatus 200 may include the information elements in FIG. 7 in a Probe Request packet as its own information and transmit the Probe Request packet.

The processing illustrated in FIG. 5 and FIG. 6 can be implemented by, for example, a CPU executing a program; however, at least part of the processing may be implemented as hardware. For example, a predetermined compiler is used to automatically generate a dedicated circuit on an FPGA from the program for implementing the steps, so that some of the operations can be implemented as hardware. Note that a gate array circuit different from an FPGA may be used, or some of the operations may be implemented as non-programmable hardware, such as an ASIC, that is different from a circuit, such as an FPGA.

OTHER EMBODIMENTS

The present invention can be implemented with a process in which a program that implements one or more functions of the above-described embodiment is supplied to a system or an apparatus via a network or a storage medium, and one or more processors in the system or the apparatus read and execute the program. Alternatively, the present invention can be implemented as a circuit (for example, an ASIC) that implements one or more functions.

According to the present invention, it is possible to provide a wireless power transfer system that allows the use of a plurality of communication methods in control communication while providing increased convenience.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A power reception apparatus comprising:
   a power reception unit configured to wirelessly receive power from a power transmission apparatus via a first antenna;
   a first communication unit configured to communicate with the power transmission apparatus via the first antenna;
   a second communication unit configured to communicate with the power transmission apparatus via a second antenna different from the first antenna; and
   a determining unit configured to determine whether the power transmission apparatus is able to perform control communication by the second communication unit, based on information obtained from the power transmission apparatus via communication by the first communication unit, the control communication being communication for controlling wireless reception of power by the power reception unit,
   wherein the second communication unit transmits a signal for establishing a communication connection by the second communication unit with the power transmission apparatus, based on the determination that the power transmission apparatus is able to perform the control communication by the second communication unit.

2. The power reception apparatus according to claim 1, wherein
   the second communication unit communicates based on a Bluetooth® standard, and
   the signal comprises an Advertising packet.

3. The power reception apparatus according to claim 2, wherein the Bluetooth® standard is the Bluetooth® Low Energy standard.

4. The power reception apparatus according to claim 1, wherein the information comprises information for specifying whether the power transmission apparatus is able to perform control communication by the second communication unit.

5. The power reception apparatus according to claim 1, wherein the first communication unit transmits, to the power transmission apparatus, a signal for request to transmit a signal including information for specifying whether the power transmission apparatus is able to perform control communication by the second communication unit.

6. The power reception apparatus according to claim 5, wherein the signal for request comprises a packet of General Request based on a WPC (Wireless Power Consortium) standard.

7. The power reception apparatus according to claim 5, wherein the signal for request comprises a signal for request to transmit a Power Transmitter Identification defined by a WPC (Wireless Power Consortium) standard.

8. The power reception apparatus according to claim 5, wherein the signal including information for specifying whether the power transmission apparatus is able to perform control communication by the second communication unit comprises identification information of the power transmission apparatus.

9. The power reception apparatus according to claim 5, wherein the first communication unit transmits the signal for request in a Negotiation phase defined by a WPC (Wireless Power Consortium) standard.

10. A control method for a power reception apparatus, comprising:
  wirelessly receiving power from a power transmission apparatus via a first antenna;
  determining, based on information obtained from the power transmission apparatus via the first antenna, whether the power transmission apparatus is able to perform control communication via a second antenna different from the first antenna, the control communication being communication for controlling wireless reception of power; and
  transmitting, via the second antenna, a signal for establishing a communication connection via the second antenna with the power transmission apparatus, based on the determination that the power transmission apparatus is able to perform the control communication via the second antenna.

11. A non-transitory computer-readable recording medium storing a program that causes a computer to execute a control method for a power reception apparatus, the control method comprising:
  wirelessly receiving power from a power transmission apparatus via a first antenna;
  determining, based on information obtained from the power transmission apparatus via the first antenna, whether the power transmission apparatus is able to perform control communication via a second antenna different from the first antenna, the control communication being communication for controlling wireless reception of power; and
  transmitting, via the second antenna, a signal for establishing a communication connection via the second antenna with the power transmission apparatus, based on the determination that the power transmission apparatus is able to perform the control communication via the second antenna.

12. A power transmission apparatus comprising:
  a power transmission unit configured to wirelessly transmit power to a power reception apparatus via a first antenna;
  a first communication unit configured to communicate with the power reception apparatus via the first antenna; and
  a second communication unit configured to communicate with the power reception apparatus via a second antenna different from the first antenna,
wherein
  the first communication unit receives, from the power reception apparatus, a signal for request to transmit a signal including information for specifying whether the power transmission apparatus is able to perform control communication by the second communication unit,
  the first communication unit transmits a signal including information for specifying that the power transmission apparatus is able to perform the control communication by the second communication unit, and
  the second communication unit receives a signal for establishing a communication connection by the second communication unit with the power reception apparatus, after the first communication unit transmits the signal including the information for specifying that the power transmission apparatus is able to perform the control communication by the second communication unit.

13. The power transmission apparatus according to claim 12, wherein
  the second communication unit transmits another signal for establishing a communication connection by the second communication unit with the power reception apparatus after the second communication unit receives the signal.

14. The power transmission apparatus according to claim 13, wherein
  the second communication unit communicates based on a Bluetooth® standard, and
  the signal received by second communication unit comprises an advertising packet.

15. The power transmission apparatus according to claim 14, wherein the Bluetooth® standard is the Bluetooth® Low Energy standard.

16. The power reception apparatus according to claim 12, wherein the signal for request comprises a packet of General Request based on a WPC (Wireless Power Consortium) standard.

17. The power reception apparatus according to claim 12, wherein the signal for request comprises a signal for request to transmit a Power Transmitter Identification defined by a WPC (Wireless Power Consortium) standard.

18. The power reception apparatus according to claim 12, wherein the signal including the information for specifying that the power transmission apparatus is able to perform control communication by the second communication unit comprises identification information of the power transmission apparatus.

19. A control method for a power transmission apparatus, comprising:
  wirelessly transmitting power to a power reception apparatus via a first antenna;
  receiving, from the power reception apparatus, via the first antenna, a signal for request to transmit a signal including information for specifying whether the power transmission apparatus is able to perform control communication via a second antenna different from the first antenna,
  transmitting, via the first antenna, a signal including information for specifying that the power transmission apparatus is able to perform the control communication via the second antenna, and
  receiving, via the second antenna, a signal for establishing a communication connection via the second antenna with the power reception apparatus, after transmitting the signal including the information for specifying that the power transmission apparatus is able to perform the control communication via the second antenna.

20. A non-transitory computer-readable recording medium storing a program that causes a computer to execute a control method for a power reception apparatus, the method comprising:
- wirelessly transmitting power to a power reception apparatus via a first antenna;
- receiving, from the power reception apparatus, via the first antenna, a signal for request to transmit a signal including information for specifying whether the power transmission apparatus is able to perform control communication via a second antenna different from the first antenna;
- transmitting, via the first antenna, a signal including information for specifying that the power transmission apparatus is able to perform the control communication via the second antenna; and
- receiving, via the second antenna, a signal for establishing a communication connection via the second antenna with the power reception apparatus, after transmitting the signal including the information for specifying that the power transmission apparatus is able to perform the control communication via the second antenna.

* * * * *